(12) United States Patent
Tatsch

(10) Patent No.: US 8,515,226 B2
(45) Date of Patent: Aug. 20, 2013

(54) SPHERICAL OPTICAL SPLITTER/COMBINER

(75) Inventor: Andrew Tatsch, Palm Harbor, FL (US)

(73) Assignee: Ocean Optics, Inc., Dunedin, FL (US)

( * ) Notice: Subject to any disclaimer, the term of this patent is extended or adjusted under 35 U.S.C. 154(b) by 274 days.

(21) Appl. No.: 12/930,802

(22) Filed: Jan. 18, 2011

(65) Prior Publication Data

US 2011/0176769 A1 Jul. 21, 2011

Related U.S. Application Data

(60) Provisional application No. 61/336,368, filed on Jan. 21, 2010.

(51) Int. Cl.
*G02B 6/26* (2006.01)
*H04J 14/02* (2006.01)

(52) U.S. Cl.
USPC .................................. 385/47; 385/31; 398/82

(58) Field of Classification Search
USPC ......... 385/15, 24, 31, 39, 46–48, 51; 398/79, 398/82
See application file for complete search history.

(56) References Cited

U.S. PATENT DOCUMENTS 6,256,427 B1 * 7/2001 Gravisse et al. ................ 385/15

* cited by examiner

*Primary Examiner* — Uyen Chau N Le
*Assistant Examiner* — Michael Mooney
(74) *Attorney, Agent, or Firm* — Dennis L. Cook, Esq.

(57) ABSTRACT

This disclosure describes a device that belongs to the field of optical devices. More specifically it is a novel way of achieving light splitting or combining using a spherical reflector with a single input and multiple outputs, or multiple inputs and a single output.

4 Claims, 2 Drawing Sheets

SPHERICAL OPTICAL SPLITTER/COMBINER

CROSS-REFERENCE TO RELATED APPLICATION

The present application claims the benefit of previously filed Provisional Patent Application, Ser. No. 61/336,368 filed Jan. 21, 2010.

FIELD OF THE INVENTION

This invention belongs to the field of optical devices. More specifically it is a novel way of achieving light splitting or combining using an internal reflector with a single input and multiple outputs, or multiple inputs and a single output. By controlling the shape of the device (e.g., non-spherical reflector), varying the reflectance of the surface, or adding specific filters (e.g., bandpass or spectrally shaped filters), intensity or spectral equalization is possible in a reproducible way.

BACKGROUND OF THE INVENTION

The challenges of designing an optical system that operates effectively as an optical splitter and combiner are that for splitting a light source into any number of outputs, such as furcated fiber optic patch cables, the amount of light getting into each of the outputs is difficult to distribute equally. Also, when operating in a combining mode, the issue with combining several discrete emission sources is that usually these emissions are not optically coaxial. This means focusing several light sources into a single fiber optic patch cable for instance, requires using off-axis optical configurations. These problems and others inherent in the prior art devices are eliminated or greatly decreased through the use of the disclosed device.

The device disclosed in this application has specific advantages over the prior art for each of the operating modes. In the splitting mode the splitting of the light source via an internal reflector guarantees that all of the outputs will be nearly identical (expected to be <1%). Furthermore, by controlling the shape of the internal reflector, varying the reflectance of the surface, or adding specific filters, intensity or spectral equalization is possible in a reproducible way. In the combiner mode the internal reflector homogenizes the discrete inputs that then can be coupled to a single fiber optic output. The different optical axes of the emission from the discrete inputs are rendered insignificant through mixing by the internal reflector. By controlling the shape of the internal reflector, varying the reflectance of the surface, or adding specific filters, intensity or spectral equalization is possible in a reproducible way

BRIEF SUMMARY OF THE INVENTION

This invention it is a novel way of achieving light splitting or combining using a internal reflector with a single input and multiple outputs, or multiple inputs and a single output.

BRIEF DESCRIPTION OF THE DRAWINGS

For a fuller understanding of the nature and objects of the invention, reference should be made to the following detailed description, taken in connection with the accompanying drawings, in which.

DESCRIPTION OF THE PREFERRED EMBODIMENT

The preferred embodiment of the invention discloses a design concept for a novel way of achieving light splitting or combining using an internal reflector with a single input and multiple outputs, or multiple inputs and a single output.

Figure 1A:
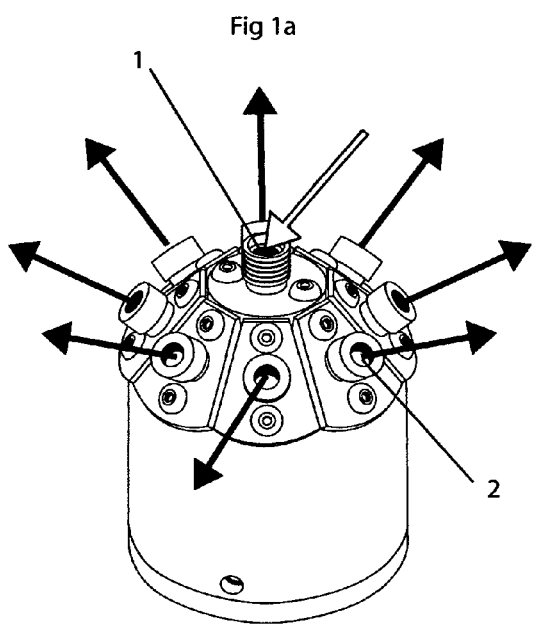
FIGS. 1(a) and 1(b) show the device operating as a splitter and a combiner.

The optical device of the preferred embodiment has two primary modes of operation. First, as shown in FIG. 1(a), a single light source can be connected to the optical input connector (1) on the top of the device and the light source hub, shown in FIGS. 2(b) and 2(c) (3) operates such that a single input (1) is "split" to multiple outputs (2). The light source input is homogenized by the internal reflector surface (4) inside the internal reflector (3) and this attenuated, homogenized light can be coupled to any one of the periphery connector outputs (2). A primary benefit of using an integrating sphere (3), for example, as an optical "hub", is that the outputs (2) are nearly identical (theoretically <1%). Also by controlling the shape of the internal reflector (3), varying the reflectance of the surface (4), or adding specific filters, intensity or spectral equalization is possible in a reproducible way.

Figure 1B:
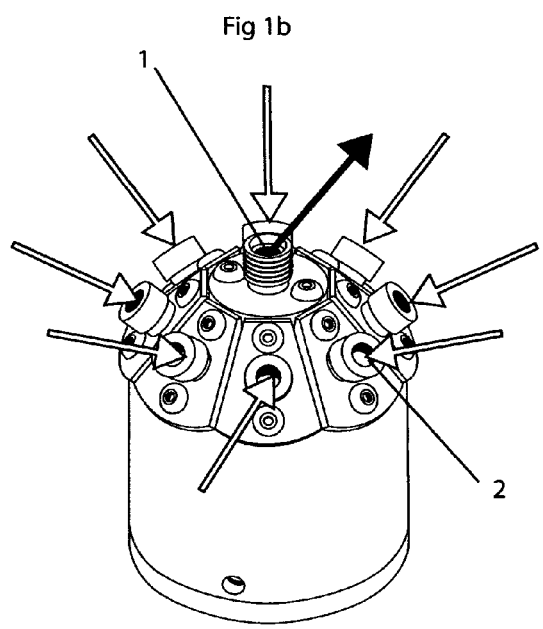

The second mode of operation is as an optical multiplexer, see FIG. 1(b). That is, any number of discrete inputs (e.g., LEDs.) can be input to the optical connectors (2) on the periphery and a multiplexed, or attenuated sum, is the output at the signal optical connector (1). Also by controlling the shape of the internal reflector (3), varying the reflectance of the surface (4), or adding specific filters, intensity or spectral equalization is possible in a reproducible way.

Figure 2A:
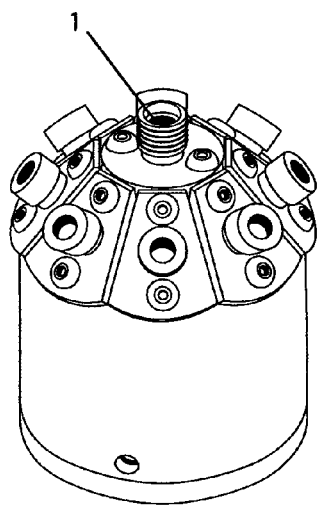
FIGS. 2(a), 2(b), and 2(c) show the device in perspective, exploded, and cut away views.
Figure 2B:
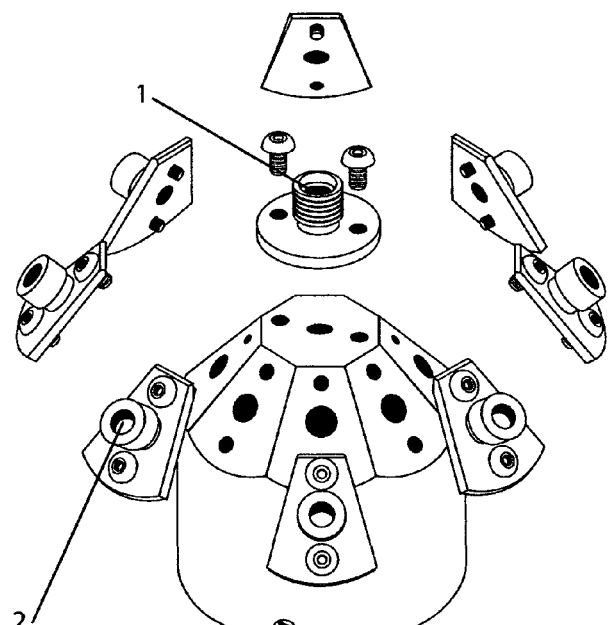
Figure 2C:
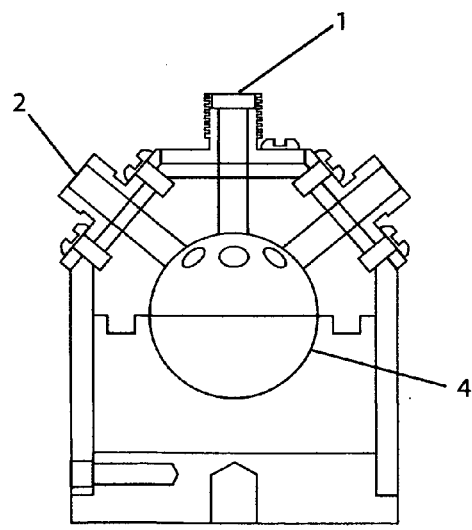
Figure 2C:
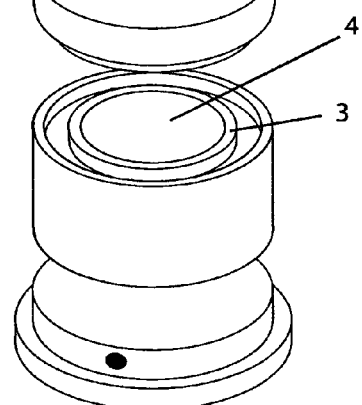

The core of the device of the preferred embodiment is an internal reflector (3) with multiple ports: a single port (1) on the polar axis of the internal reflector (3) and any number of ports (2) on the periphery, as shown in FIGS. 2(a) and (b) with an internal spherical reflector (3) with nine ports (1 & 2) as an example. The port geometry is such that no light from one port (1 & 2) can pass directly to another port (1 & 2) without first reflecting from the internal surface (4) of the integrating sphere (3). A section view is provided in FIG. 2(c). This section view illustrates the internal integrating sphere (3) and port orientation of the preferred embodiment.

Since certain changes may be made in the above described spherical optical splitter/combiner device without departing from the scope of the invention herein involved, it is intended that all matter contained in the description thereof or shown in the accompanying figures shall be interpreted as illustrative and not in a limiting sense.

What is claimed is:

1. An optical combiner/divider for combining or dividing multiple differing optical signals from one common input/output port to numerous independent input/output ports comprising:

a hollow optical hub having an interior surface that is reflective;

said hollow optical hub having a common optical input/output port allowing optical connection from outside said hollow optical hub to inside said hollow optical hub;

said hollow optical hub having 2 or more independent optical input/output ports allowing optical connection from outside said hollow optical hub to inside said hollow optical hub; and, said 2 or more independent optical input/output ports and said common optical input/output port being aligned on said hollow optical hub such that light entering from said common optical input/output port or one of said 2 or more independent optical input/output ports must first strike directly on said reflective interior surface of said hollow optical hub before any other reflecting or exiting out of another of said common optical input/output port or 2 or more independent optical input/output ports.

2. The optical combiner/divider of claim 1 wherein the shape of said reflective interior surface is spherical.

3. The optical combiner/divider of claim 1 wherein the reflectance of said reflective interior surface is variable.

4. The optical combiner/divider of claim 1 wherein filters are added to said common optical input/output port and/or said 2 or more independent optical input/output ports.

* * * * *